July 26, 1949.  A. C. TEOLIS  2,477,354
SAFETY CLASP FOR NECKLACES
Filed Jan. 10, 1948

Angelo C. Teolis
INVENTOR.
Thomas A. Jenckes
BY Attorney

Patented July 26, 1949

2,477,354

UNITED STATES PATENT OFFICE 2,477,354

SAFETY CLASP FOR NECKLACES

Angelo Ceasar Teolis, Johnston, R. I.

Application January 10, 1948, Serial No. 1,575

4 Claims. (Cl. 24—214)

My invention relates to improvements in safety clasps for the ends of necklaces, chains, bracelets, straps and the like.

An object of my invention is to provide a safety clasp which has three separate safety features which operate successively. To this end I provide a resilient male member comprising jaws joined together by a spring loop and normally spread outwardly thereby, having notches therein to engage the ends of a slot in a female member to provide an initial lock or latch, with the walls of said loop being of greater width than said slot so as to positively prevent the clasp from disengaging in the event that a sudden jar or other movement urges the male member notches away from the female member end wall and with a supplemental safety feature that the clasp can only be completely disengaged if the male member is tilted at right angles to the female member.

A further object of my invention is to provide a clasp which can be completely disengaged if desired or which may, if desired not to be completely disengaged, provide the two safety features mentioned above.

A further object of my invention is to provide a clasp of this description wherein all the above latching and locking features reside in the structure of the male member itself and in which the shape of the male member provides successive latching features thereby obviating the necessity of any cooperating posts in or special construction of the female member.

A further object of my invention is to provide a device constructed of two parts only, each of which may be readily made from a single piece of material and thus to provide a device which is relatively easy and cheap to manufacture.

A further object of my invention is to provide a latch which has no weak parts apt to break, or protruding parts apt to stick into the wearer.

These and such other objects of my invention as may hereinafter appear will be best understood from a description of the accompanying drawings which illustrate embodiments thereof.

In the drawings,

Fig. 1 is an end elevation of a safety clasp constructed in accordance with my invention.

Figs. 2, 3, 4 and 5 are side views of my improved clasp member with a side wall removed and showing the top, bottom and end walls in section along the line 2—2 of Fig. 1 and showing the male clasp member in various relative positions in elevation, Fig. 2 showing the device completely locked, Fig. 3 showing the device partially unlocked, Fig. 4 showing how the bulges in the loop function as a supplemental latch to prevent disengagement of the strap should the male member be urged out of the notches and Fig. 5 being a view illustrating how the male member must be tilted substantially at right angles from its attached position for insertion or removal from the female member.

Figure 8:
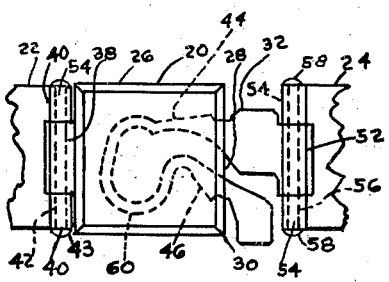
Fig. 8 is a side elevation of a different embodiment of my invention having instead of the eye means on the outer ends of the male member and female member for attachment to the strap ends, sleeves on the outer ends of said respective members to receive pins on the ends of the adjacent respective strap ends.
Figure 9:
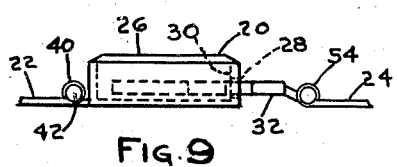
Fig. 9 is a bottom view of the structure shown in Fig. 8.

In the drawings, wherein like characters of reference generally indicate like parts throughout, 20 generally indicates a safety clasp for the ends 22 and 24 of a necklace, chain, bracelet, strap or the like. Said safety clasp 20 comprises a hollow female member 26 preferably of flat oblong box shape which may be readily stamped out of flat stock with or without a cover. Said female member has the transverse slot 28 in the inner end 30 thereof of substantial length to receive the male member 32 therein. Said female member may also be provided with suitable strap attaching means 34 on the outer end thereof, in the embodiment shown in Figs. 1–5 comprising a plurality of aligned eyes 36 and in the embodiment shown in Figs. 8 and 9 a transverse sleeve 38 projecting outwardly from said female member 26. The inner end of the adjacent strap end 22 is preferably provided with the spaced ears 40 and the securing pin 42, having the upset ends 43, extends through said ears and sleeve to pivotally attach the strap end 22 to the outer end of the female member. It is obvious, however, that any suitable type of strap end attaching means may be provided.

The resilient male member 32, wherein my invention chiefly resides, is preferably constructed of a single piece of material which, when reduced to narrow form, is resilient. Said member 32 comprises an upper jaw 44 adapted to project inwardly through said slot 28 within said female member 26 and a lower jaw 46 adapted to project similarly inwardly through said slot 28 within the hollow female member 26. Said male member is provided with strap end attaching means 48 on the outer end thereof, in the embodiment shown in Figs. 1-7 comprising the eyes 50, two in the upper jaw and one in the lower jaw, although any other suitable type of strap end attaching means may be provided, such as the sleeve 52 projecting outwardly from the upper jaw shown in Fig. 8, the spaced ears 54 on the inner end of the strap end 24 and the pin 56 extending through said sleeve 52 and ears 54 having the upset ends 58 to secure it in position, although any other suitable type of means may be provided to attach the male member 32 to the strap end 24.

Figure 2:
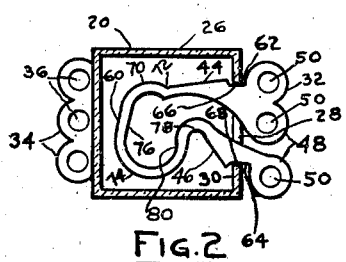
Figure 1:
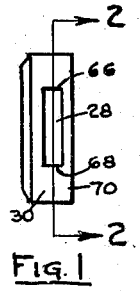
Figure 3:
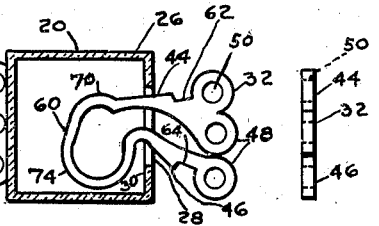
Figure 6:
Fig. 6 is an end elevation of the male member taken from its outer end.
Figure 4:
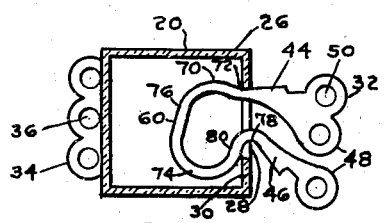

I also provide the resilient loop 60 joining the inner ends of said upper jaw 44 and lower jaw 46 together, of greater width than the slot 28. Said jaws 44 and 46 each have the notch 62 and 64 respectively on the external surface thereof, whereby said jaws may be squeezed together for insertion within said slot 28 in a manner to be explained and retained together in squeezed position until said notches 62 and 64 come opposite the portions 66 and 68 respectively of the inner end wall 30 of said female member 26, when on removal of compression on said jaws, said resilient loop 60 may cause them to expand or spread to engage the portions 66 and 68 of the end wall of the female member at the ends of said slot 28 within said notches 62 and 64 respectively. Said loop 60 has at least a slight bulge 70 on one side thereof, in the embodiment shown on the upper side thereof, providing a slight groove 72 between said jaw 44 and loop 60. Said loop in the embodiment shown, when it is desired to remove the male member 32 completely from the female member, is provided with a large bulge 74 on the opposite side thereof, in the embodiment shown in the lower side thereof adjacent the lower jaw 46. In all embodiments, the loop 60 has a substantially flat inner end wall 76 and a groove 78 is provided between the inner end of the large lower bulge 74 of the loop 60 and the lower jaw 46, which, in the embodiment shown, projects downwardly angularly from said groove 78, the bulge 74 thus projecting upwardly as at 80 to said groove and the device is so shaped that the distance between the inner end wall 76 of said loop 60 and the outer end wall 80 of said larger bulge 74 is less than the width of said slot 28, for a purpose to be described. However, when inserted, the total width of said loop 60 with the addition of both the upper bulge 70 and the lower bulge 74 thereto is greater than the width of said slot 28, whereby said bulges 70 and 74 may retain said male member 32 within said female member 26 should said notches 62 and 64 become released from the adjacent portions 66 and 68 of said end wall 70, to provide a supplemental locking feature as shown in Fig. 4.

As stated, I provide an additional feature, i. e., that the male member 32 may be inserted or removed from the female member 26 only when it is turned substantially 90° relative thereto, so that the loop 60 may pass through said slot as explained, the distance between the outer wall 80 of the bulge 74 and the inner end wall 76 of said loop being less than the width of said slot 28 for this purpose. It is obvious, however, that this feature may be omitted, should it be desired to provide a catch in which the male member and female member may be released a limited amount only and not completely disengaged.

Figure 10:
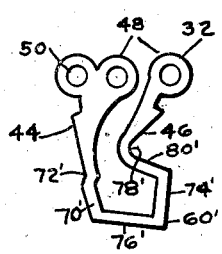
Fig. 10 is a side elevation of a slightly modified form of male member.
Figure 11:
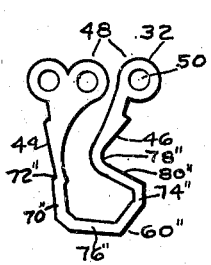
Fig. 11 is a side elevation of a further modified form of male member.

In the embodiment shown in Figs. 1-7, the upper bulge comprises the slight arcuate bulge extending upwardly from the groove 70 to the substantially flat end wall 76 of the loop with the upper jaw 44 extending substantially horizontally outwardly from the groove 72 connecting said bulge 70 of the loop with the inner end of said jaw. In this embodiment the entire lower portion is arcuate to the groove 78 connecting the loop with the downwardly projecting lower jaw 46. If desired, however, the exact shape of the loop may be slightly varied so that the respective bulges 70 and 74 are not of true arcuate shape, but may comprise generally straight lines as shown in Figs. 10 and 11 which differ from each other in that the ends of the inner wall of the loop shown in Fig. 11 are joined to the respective bulges by additional straight lines thereby more closely simulating the curved lines of the loop of the preferred embodiment shown in Figs. 1-7. The respective bulges 60, 70 and 74 and their respective similar portions 72, 76, 78 and 80 are respectively primed in Fig. 10 and double primed in Fig. 11, for while the general shapes of the parts are similar, the shapes thereof vary somewhat specifically from that shown in the preferred embodiment in Fig. 7.

Figure 5:
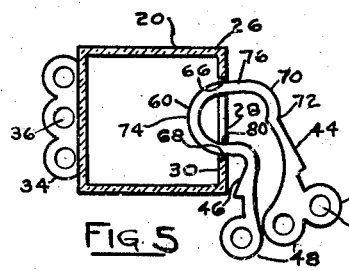
Figure 7:
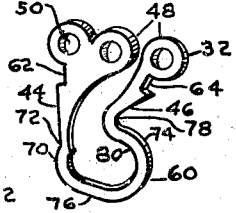
Fig. 7 is a perspective view of my preferred embodiment of male member.

To insert the male member within the female member, it is merely necessary to compress the outer ends of the upper and lower jaws 44 and 46 of the male member together and bring the male member adjacent the female member in a substantially vertical position tilted substantially 90° from the horizontal so as to bring the portion thereof between the end wall 76 of the loop and the outer end 80 of the bulge 74, i. e., the width of the lower loop means, into position so that the lower bulge 74 may be inserted through the slot 28, as shown in Fig. 5. Immediately after insertion, the male member is raised substantially 90° to a horizontal position and, while the upper and lower jaws are still compressed, the male member is inserted inwardly from the position shown in Fig. 4, through the position shown in Fig. 3 to the position shown in Fig. 2, when on pressure being released from the upper and lower jaws 44 and 46, respectively, they may spring outwardly so that the respective adjacent portions 66 and 68 of the end wall 30 of the female member may project within said respective notches 62 and 64 when the device will remain in a latched position in use. Should the jaws become temporarily compressed in use and axial pressure be exerted on the strap ends they will not become disengaged but will merely extend outwardly until the respective portions 66 and 68 abut the respective bulges 70 and 74 as shown in Fig. 4, thereby positively preventing further disengagement of the catch and providing a supplemental lock.

It is obvious that even then the device can not become fully disengaged until the male member is tilted substantially 90° at right angles to the female member to permit the loop 60 to be drawn out of the slot 28 in the manner previously explained for insertion thereof therein only after squeezing pressure is exerted on the respective jaws.

The device may be removed in reverse manner to the manner in which it is attached, as previously explained.

It is apparent, therefore, that I have provided a novel type of triple safety clasp, with the advantages explained above.

It is understood that my invention is not limited to the specific embodiment shown and that various deviations may be made therefrom without departing from the spirit and scope of the appended claims.

What I claim is:

1. A safety clasp for the ends of necklaces, chains, bracelets, straps and the like, comprising a hollow oblong box shape female member, having an extended transverse slot in the inner end thereof and strap end attaching eye means on the outer end thereof and a resilient male member having opposite strap end attaching eye means on the outer end thereof, comprising an upper jaw, a lower jaw and a resilient loop of greater width than said slot joining the inner ends of said jaws together, said jaws each having a notch on the external surface thereof, whereby said jaws may be squeezed together for insertion within said slit and thereafter on removal of pressure therefrom said jaws may be urged outwardly by said resilient loop to receive the portions of the end wall of said female member at the ends of said slot within said notches, said loop having at least a slight bulge on one side thereof and a large bulge on the opposite side thereof, with the distance between the inner end wall of said loop and the outer end of said large bulge less than the width of said slot, with the width of said loop with both said bulges greater than the width of said slot, whereby said bulge portions may retain said male member within said female member if said notches are released from said end wall and said male member may be removed from or inserted within said female member on substantially a right angle tilting thereof to permit said loop to pass through said slot.

2. A safety clasp for the ends of necklaces, chains, bracelets, straps and the like, comprising a hollow female member, having an extended transverse slot in the inner end thereof and strap end attaching means on the outer end thereof and a resilient male member having opposite strap end attaching means on the outer end thereof, comprising an upper jaw, a lower jaw and a resilient loop of greater width than said slot joining the inner ends of said jaws together, said jaws each having a notch on the external surface thereof, whereby said jaws may be squeezed together for insertion within said slot and thereafter on removal of pressure therefrom said jaws may be urged outwardly by said resilient loop to receive the portions of the end wall of said female member at the ends of said slot in said notches, said loop having at least a slight bulge on one side thereof and a large bulge on the opposite side thereof, with the distance between the inner end wall of said loop and the outer end of said large bulge less than the width of said slot, with the width of said loop with both said bulges greater than the width of said slot, whereby said bulge portions may retain said male member within said female member if said notches are released from said end wall and said male member may be removed from or inserted within said female member on substantially a right angle tilting thereof to permit said loop to pass through said slot.

3. A safety clasp for the ends of necklaces, chains, bracelets, straps and the like, comprising a hollow oblong box shape female member, having an extended transverse slot in the inner end thereof and strap end attaching eye means on the outer end thereof and a resilient male member having opposite strap end attaching eye means on the outer end thereof, comprising an upper jaw, a lower jaw and a resilient loop joining the inner ends of said jaws together, said jaws each having a notch on the external surface thereof, whereby on removal of pressure therefrom said jaws may be urged outwardly by said resilient loop to receive the portions of the end wall of said female member at the ends of said slot in said notches, said loop having bulges on each side thereof, with the width of said loop with both said bulges being greater than the width of said slot, whereby said portions may retain said male member within said female member if said notches are released from said end wall.

4. A safety clasp for the ends of necklaces, chains, bracelets, straps and the like, comprising a hollow female member having an extended transverse slot in the inner end thereof and strap end attaching means on the outer end thereof and a resilient male member having opposite strap end attaching means on the outer end thereof, comprising an upper jaw, a lower jaw and a resilient loop joining the inner ends of said jaws together, said jaws each having a notch on the external surface thereof, whereby on removal of pressure therefrom said jaws may be urged outwardly by said resilient loop to receive the portions of the end wall of said female member in the ends of said slot in said notches, said loop having bulges on each side thereof with the width of said loop with both said bulges being greater than the width of said slot, whereby said portions may retain said male member within said female member if said notches are released from said end wall.

ANGELO CEASAR TEOLIS.

REFERENCES CITED

The following references are of record in the file of this patent:

UNITED STATES PATENTS

| Number | Name | Date |
| --- | --- | --- |
| 1,557,133 | Backert | Oct. 13, 1925 |